US009905913B2

(12) United States Patent
Hung et al.

(10) Patent No.: US 9,905,913 B2
(45) Date of Patent: Feb. 27, 2018

(54) ANTENNA STRUCTURE AND WIRELESS COMMUNICATION DEVICE USING SAME

(71) Applicant: Chiun Mai Communication Systems, Inc., New Taipei (TW)

(72) Inventors: Kai-Ting Hung, New Taipei (TW); Cho-Kang Hsu, New Taipei (TW); Men-Hsueh Tsai, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/651,037

(22) Filed: Jul. 17, 2017

(65) Prior Publication Data

US 2018/0026350 A1 Jan. 25, 2018

Related U.S. Application Data

(60) Provisional application No. 62/364,876, filed on Jul. 21, 2016.

(30) Foreign Application Priority Data

Jun. 9, 2017 (TW) ............................ 106119261 A

(51) Int. Cl.

| | |
|---|---|
| ***H04M 1/00*** | (2006.01) |
| ***H01Q 1/24*** | (2006.01) |
| ***H01Q 5/371*** | (2015.01) |
| ***H01Q 5/10*** | (2015.01) |
| ***H01Q 13/10*** | (2006.01) |

(52) U.S. Cl.

CPC ............... *H01Q 1/243* (2013.01); *H01Q 5/10* (2015.01); *H01Q 5/371* (2015.01); *H01Q 13/10* (2013.01)

(58) Field of Classification Search

CPC ........ H01Q 1/243; H01Q 5/371; H01Q 13/10; H01Q 5/10

USPC .................................... 455/575.7, 90.2, 90.3

See application file for complete search history.

(56) References Cited

U.S. PATENT DOCUMENTS

| | | | | |
|---|---|---|---|---|
| 8,842,048 B2 * | 9/2014 | Kim | H01Q 1/243 | 343/702 |
| 8,954,122 B2 * | 2/2015 | Wilmhoff | H01Q 1/245 | 342/375 |
| 9,035,840 B1 * | 5/2015 | Lee | H01Q 1/243 | 343/702 |
| 9,105,968 B2 * | 8/2015 | Hong | H01Q 1/243 | |
| 9,124,679 B2 * | 9/2015 | Ash, Jr. | H01Q 1/243 | |
| 9,196,952 B2 * | 11/2015 | Tran | H01Q 1/243 | |

(Continued)

*Primary Examiner* — April G Gonzales

(74) *Attorney, Agent, or Firm* — ScienBiziP, P.C.

(57) ABSTRACT

An antenna structure includes a metal housing, a first feed portion, a first ground portion, a second ground portion, and a radiator. The metal housing includes a front frame, a backboard, and a side frame. The side frame defines a slot and the front frame defines a gap. The metal housing is divided into at least a long portion and a short portion by the slot and the gap. One end of the first feed portion is electrically connected to the long portion for feeding current to the long portion and another end of the first feed portion is electrically connected to the backboard. The first and second ground portions are both electrically connected to the long portion for grounding the long portion. The radiator is positioned in the metal housing, electrically connected to the backboard, and is spaced apart from the short portion.

20 Claims, 21 Drawing Sheets

200

(56) References Cited

U.S. PATENT DOCUMENTS

| | | | | |
|---|---|---|---|---|
| 9,337,528 | B2 * | 5/2016 | Hammond | H01Q 1/243 |
| 9,397,727 | B1 * | 7/2016 | Mattsson | H04B 5/0081 |
| 9,462,096 | B2 * | 10/2016 | Han | H01Q 1/243 |
| 9,578,769 | B2 * | 2/2017 | Woodhull | B23P 11/00 |
| 9,673,507 | B2 * | 6/2017 | Ramachandran | H01Q 1/243 |
| 9,730,312 | B2 * | 8/2017 | Dumpit | H05K 1/0215 |
| 9,768,492 | B2 * | 9/2017 | Kim | H01Q 1/243 |
| 9,832,295 | B2 * | 11/2017 | Ash, Jr. | H04M 1/026 |
| 2012/0206302 | A1 * | 8/2012 | Ramachandran | H01Q 1/24 343/702 |
| 2015/0372372 | A1 * | 12/2015 | Lee | H01Q 1/243 343/702 |
| 2017/0194709 | A1 * | 7/2017 | Jansson | H01Q 7/00 |

* cited by examiner

ANTENNA STRUCTURE AND WIRELESS COMMUNICATION DEVICE USING SAME

CROSS-REFERENCE TO RELATED APPLICATIONS

This application claims priority to Taiwanese Patent Application No. 106119261 filed on Jun. 9, 2017, and claims priority to U.S. Patent Application No. 62/364876, filed on Jul. 21, 2016, the contents of which are incorporated by reference herein.

FIELD

The subject matter herein generally relates to an antenna structure and a wireless communication device using the antenna structure.

BACKGROUND

Metal housings, for example, metallic backboards, are widely used for wireless communication devices, such as mobile phones or personal digital assistants (PDAs). Antennas are also important components in wireless communication devices for receiving and transmitting wireless signals at different frequencies, such as signals in Long Term Evolution Advanced (LTE-A) frequency bands. However, when the antenna is located in the metal housing, the antenna signals are often shielded by the metal housing. This can degrade the operation of the wireless communication device. Additionally, the metallic backboard generally defines slots or/and gaps thereon, which will affect an integrity and an aesthetic quality of the metallic backboard.

BRIEF DESCRIPTION OF THE DRAWINGS

Implementations of the present technology will now be described, by way of example only, with reference to the attached figures.

FIG. 15 is a current path distribution graph when the antenna structure of

FIG. 11 works at a first operation mode.

FIG. 16 is a current path distribution graph when the antenna structure of

FIG. 11 works at a second operation mode.

DETAILED DESCRIPTION

Figure 1:
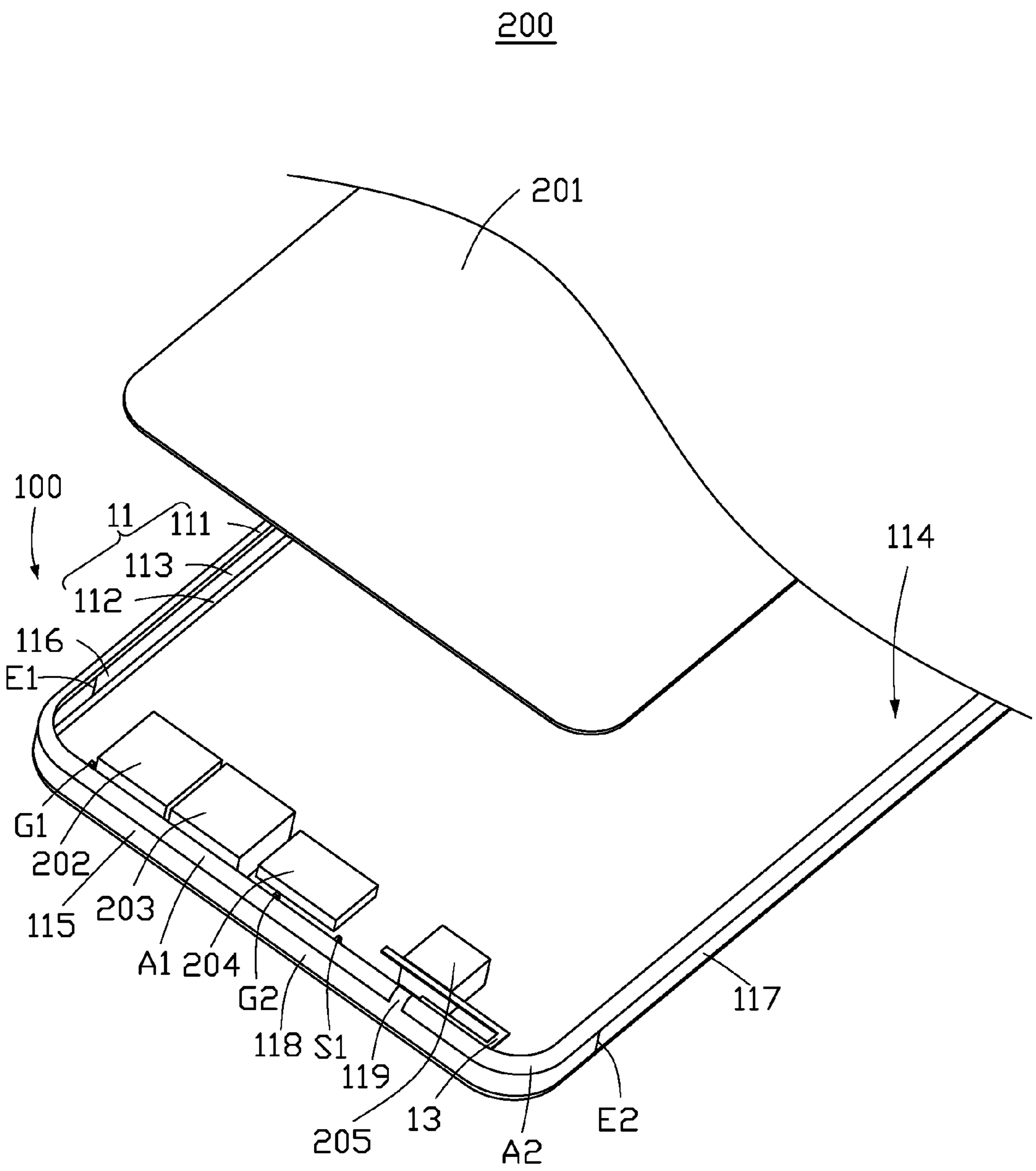
FIG. 1 is an isometric view of a first exemplary embodiment of a wireless communication device using a first exemplary antenna structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna structure and a wireless communication device using same.

Exemplary Embodiment 1

FIG. 1 illustrates an embodiment of a wireless communication device 200 using a first exemplary antenna structure 100. The wireless communication device 200 can be a mobile phone or a personal digital assistant, for example. The antenna structure 100 can receive and send wireless signals.

Figure 2:
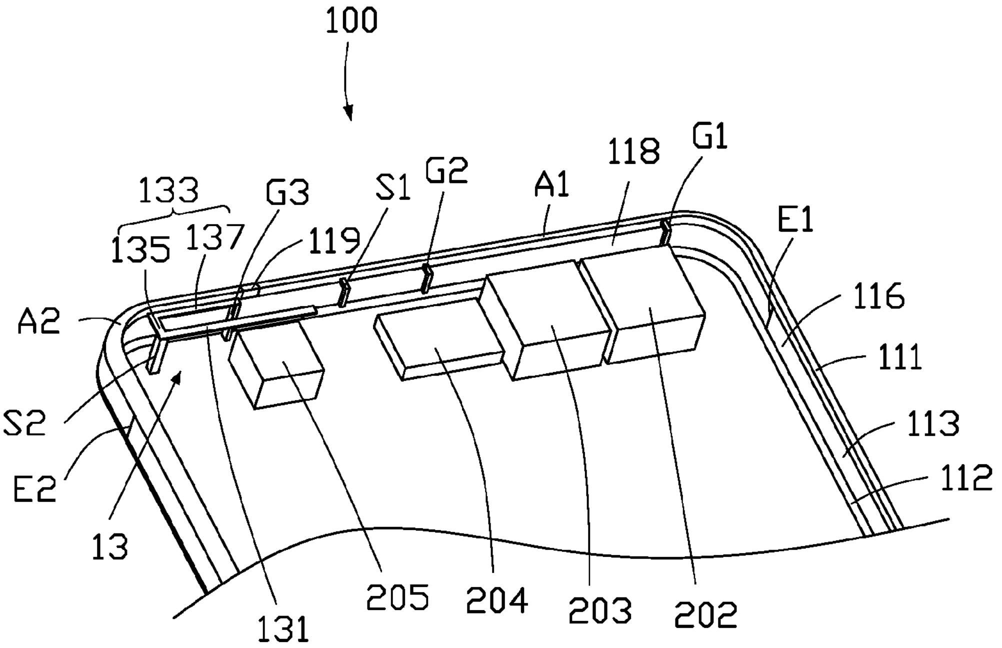
FIG. 2 is similar to FIG. 1, but shown from another angle.

Per FIG. 2, the antenna structure 100 includes a housing 11, a first feed portion S1, a first ground portion G1, a second ground portion G2, and a radiator 13. The housing 11 can be a metal housing of the wireless communication device 200. In this exemplary embodiment, the housing 11 is a frame structure and is made of metallic material. The housing 11 includes a front frame 111, a backboard 112, and a side frame 113. The front frame 111, the backboard 112, and the side frame 113 can be integral with each other. The front frame 111, the backboard 112, and the side frame 113 cooperatively form the metal housing of the wireless communication device 200.

The front frame 111 defines an opening (not shown) thereon. The wireless communication device 200 includes a display 201. The display 201 is received in the opening. The display 201 has a display surface. The display surface is exposed at the opening and is positioned parallel to the backboard 112.

The backboard 112 is positioned opposite to the front frame 111. The backboard 112 is directly connected to the side frame 113 and there is no gap between the backboard 112 and the side frame 113. In this exemplary embodiment, the backboard 112 serves as a ground of the antenna structure 100 and the wireless communication device 200.

The side frame 113 is positioned between the front frame 111 and the backboard 112. The side frame 113 is positioned around a periphery of the front frame 111 and a periphery of the backboard 112. The side frame 113 forms a receiving space 114 together with the display 201, the front frame 111, and the backboard 112. The receiving space 114 can receive a printed circuit board, a processing unit, or other electronic components or modules.

The side frame 113 includes an end portion 115, a first side portion 116, and a second side portion 117. In this exemplary embodiment, the end portion 115 is a top portion of the wireless communication device 200. The end portion 115 connects the front frame 111 and the backboard 112. The first side portion 116 is positioned apart from and parallel to the second side portion 117. The end portion 115 has first and second ends. The first side portion 116 is connected to the first end of the first frame 111 and the second side portion 117 is connected to the second end of the end portion 115. The first side portion 116 connects the front frame 111 and the backboard 112. The second side portion 117 also connects the front frame 111 and the backboard 112.

The side frame 113 defines a slot 118. The front frame 111 defines a gap 119. In this exemplary embodiment, the slot 118 is defined at the end portion 115 and extends to the first side portion 116 and the second portion 117. In other exemplary embodiments, the slot 118 is only defined at the end portion 115 and does not extend to any one of the first side portion 116 and the second portion 117. In other exemplary embodiments, the slot 118 can be defined at the end portion 115 and extend to one of the first side portion 116 and the second portion 117.

The gap 119 communicates with the slot 118 and extends across the front frame 111. The gap 119 and the slot 118 cooperatively form a T-shaped structure. In this exemplary embodiment, the gap 119 is positioned adjacent to the second side portion 117. The front frame 111 is divided into two portions by the slot 118 and the gap 119. The two portions are a long portion A1 and a short portion A2 (long and short relative to each other). A first portion of the front frame 111 extends from a first side of the gap 119 to a first end E1 of the slot 118 forms the long portion A1. A second portion of the front frame 111 extends from a second side of the gap 119 to a second end E2 of the slot 118 forms the short portion A2.

In this exemplary embodiment, the gap 119 is not positioned at a middle portion of the end portion 115. The long portion A1 is longer than the short portion A2.

In this exemplary embodiment, the slot 118 and the gap 119 are both filled with insulating material, for example, plastic, rubber, glass, wood, ceramic, or the like, thereby isolating the long portion A1, the short portion A2, and the other parts of the housing 11.

In this exemplary embodiment, the slot 118 is defined on the end of the side frame 113 adjacent to the backboard 112 and extends to the front frame 111. Then the long portion A1 and the short portion A2 are fully formed by a portion of the front frame 111. In other exemplary embodiments, a position of the slot 118 can be adjusted. For example, the slot 118 is defined on the end of the side frame 113 adjacent to the backboard 112 and extends towards the front frame 111. Then the long portion A1 and the short portion A2 are formed by a portion of the front frame 111 and a portion of the side frame 113.

In this exemplary embodiment, except for the slot 118 and the gap 119, an upper half portion of the front frame 111 and the side frame 113 does not define any other slot, break line, and/or gap. That is, there is only one gap 119 defined on the upper half portion of the front frame 111.

Per FIG. 2, in this exemplary embodiment, the first feed portion S1 is positioned in the receiving space 114 and is positioned adjacent to the gap 119. One end of the first feed portion S1 is electrically connected to the long portion A1 for feeding current to the long portion A1. Another end of the first feed portion S1 is electrically connected to the backboard 112 as the ground connection.

The first ground portion G1 and the second ground portion G2 are positioned in the receiving space 114 and are positioned adjacent to each other. The first ground portion G1 is positioned adjacent to the first side portion 116. One end of the first ground portion G1 is electrically connected to the long portion A1. Another end of the first ground portion G1 is electrically connected to backboard 112 for grounding the long portion A1. The second ground portion G2 is positioned between the first feed portion S1 and the first ground portion G1. One end of the second ground portion G2 is electrically connected to the long portion A1. Another end of the second ground portion G2 is electrically connected to backboard 112 for grounding the long portion A1.

The radiator 13 is positioned in the receiving space 114 and is positioned adjacent to the short portion A2. The radiator 13 includes a second feed portion S2, a third ground portion G3, a first radiating portion 131, and a second radiating portion 133. The second feed portion S2 is positioned in the receiving space 114 and is positioned adjacent to the second side portion 117. One end of the second feed portion S2 is electrically connected to the first radiating portion 131 and the second radiating portion 133 for feeding current to the first radiating portion 131 and the second radiating portion 133. Another end of the second feed portion S2 is electrically connected to backboard 112 to be grounded. The third ground portion G3 is substantially rectangular and is positioned in the receiving space 114. The third ground portion G3 is positioned adjacent to the gap 119 and is spaced apart from the second feed portion S2.

The first radiating portion 131 is substantially rectangular and is positioned at a plane parallel to the plane of the backboard 112. The first radiating portion 131 is electrically connected to the end of the second feed portion S2 away from the backboard 112 and extends along a direction parallel to the end portion 115 towards the first side portion 116.

The second radiating portion 133 is substantially L-shaped and includes a first radiating section 135 and a second radiating section 137. The first radiating section 135 is substantially rectangular and is coplanar with the first radiating portion 131. One end of the first radiating section 135 is electrically connected to a junction of the second feed portion S2 and the first radiating portion 131. Another end of the first radiating section 135 extends along a direction parallel to the second side portion 117 towards the short portion A2. The second radiating section 137 is substantially rectangular and is coplanar with the first radiating section 135. The second radiating section 137 is electrically connected to the end of the first radiating section 135 away from the second feed portion S2 and extends along a direction parallel to the end portion 115 towards the first side portion 116 until the second radiating section 137 is electrically connected to the end of the third ground portion G3 away from the backboard 112.

In this exemplary embodiment, the second radiating section 137 is longer than the first radiating section 135. The first radiating portion 131 is longer than the second radiating portion 133. The second radiating portion 133 is spaced apart from the short portion A2.

Figure 3:
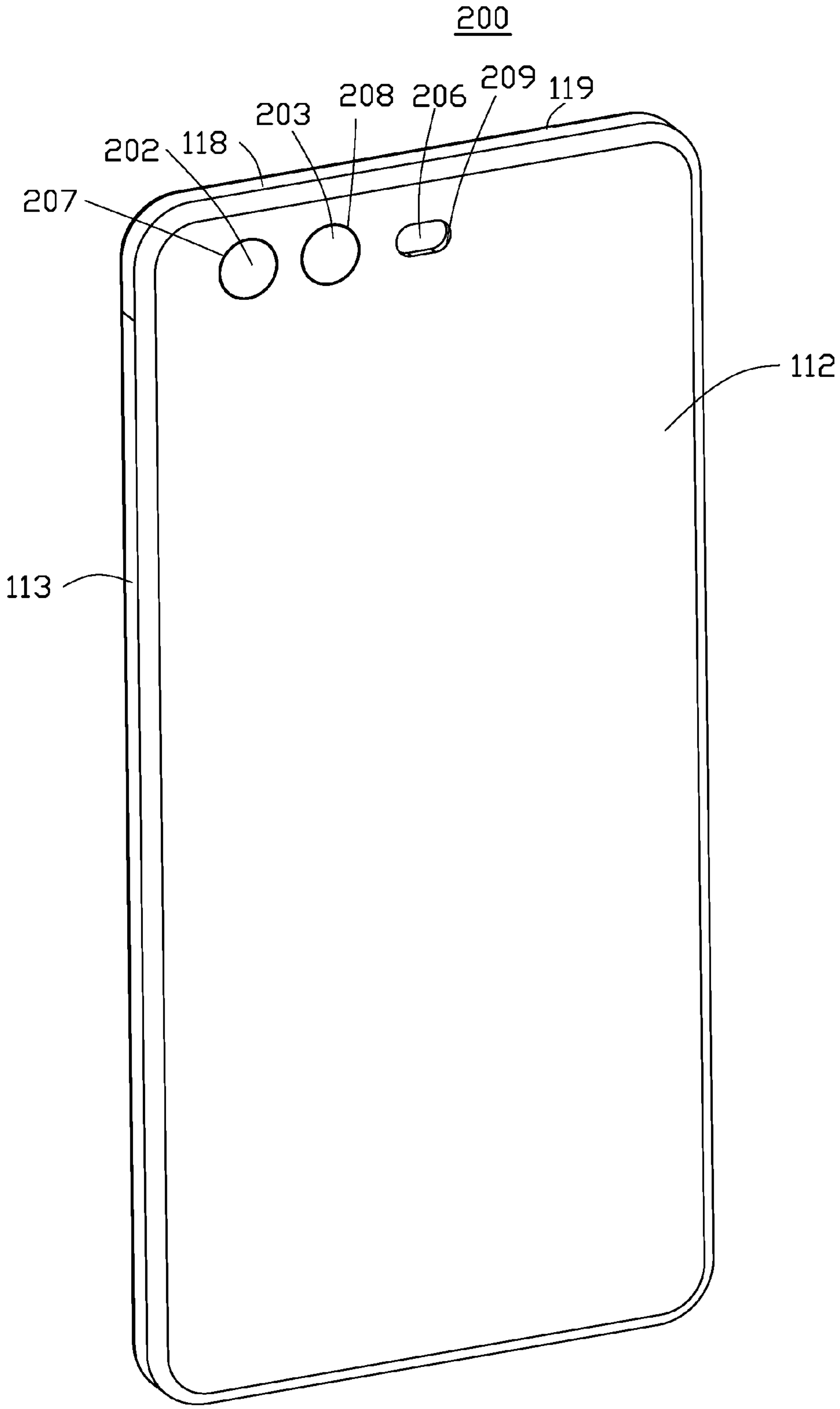
FIG. 3 is an assembled, isometric view of the wireless communication device of FIG. 1.

Per FIG. 2 and FIG. 3, in this exemplary embodiment, the wireless communication device 200 includes at least one electronic element. In this exemplary embodiment, the wireless communication device 200 includes at least five electronic elements, that is, a first electronic element 202, a second electronic element 203, a third electronic element 204, a fourth electronic element 205, and a fifth electronic element 206. In this exemplary embodiment, the first electronic element 202 and the second electronic element 203 are both rear camera modules. The first electronic element 202 and the second electronic element 203 are positioned between the first ground portion G1 and the second portion G2. The first electronic element 202 and the second electronic element 203 are spaced apart from each other. The third electronic element 204 is a speaker module. The third electronic element 204 is positioned between the first feed portion S1 and the second electronic element 203. The fourth electronic element 205 is a front camera module. The fourth electronic element 205 is positioned between the first feed portion S1 and the second feed portion S2. The fifth electronic element 206 is a flash light.

Per. FIG. 2, the backboard 112 is an integral and single metallic sheet. Except the holes 207, 208, and 209 for exposing two camera lenses (that is, the first electronic element 202 and the second electronic element 203) and the flash light (that is, the fifth electronic element 206), the backboard 112 does not define any other slot, break line, and/or gap.

In this exemplary embodiment, when current enters from the first feed portion S1, the current flows through the long portion A1 and is grounded by the position of the long portion A1 adjacent to the first end E1, the first ground portion G1, and the second ground portion G2. This activates a first operation mode for generating radiation signals in a first frequency band. In this exemplary embodiment, the first operation mode is LTE-A low, middle, and high frequency modes. The first frequency band includes frequency bands of about 704-787 MHz, 824-960 MHz, and 1710-2690 MHz. When the current enters from the first feed portion S1, the current flows through the long portion A1 and is grounded by the position of the long portion A1 adjacent to the first end E1, to generate radiation signals in a frequency band of about 704-787 MHz. When the current enters from the first feed portion S1, the current flows through the long portion A1 and is grounded by the first ground portion G1, to generate radiation signals in a frequency band of about 824-960 MHz. When the current enters from the first feed portion S1, the current flows through the long portion A1 and is grounded by the second ground portion G2, to generate radiation signals in a frequency band of about 1710-2690 MHz.

When the current enters from the second feed portion S2, the current flows through the first radiating portion 131. The second feed portion S2 and the first radiating portion 131 cooperatively form a monopole antenna. This activates a second operation mode for generating radiation signals in a second frequency band. When the current enters from the second feed portion S2, the current flows through the first radiating section 135 and the second radiating section 137 of the second radiating portion 133, and is grounded by the third ground portion G3.

The second feed portion S2, second radiating portion 133, and the third ground portion G3 cooperatively form a loop antenna to activate a third operation mode for generating radiation signals in a third frequency band. When the current enters from the second feed portion S2, the current flows through the second radiating portion 133, and is electronically coupled to short portion A2 through the second radiating portion 133. The current is grounded because of the position of the short portion A2 adjacent to the second end E2, and this activates a fourth operation mode for generating radiation signals in a fourth frequency band. In this exemplary embodiment, the second operation mode is a WIFI 2.4G operation mode. The third operation mode is a WIFI 5G operation mode. The fourth operation mode is a GPS operation mode.

Figure 4:
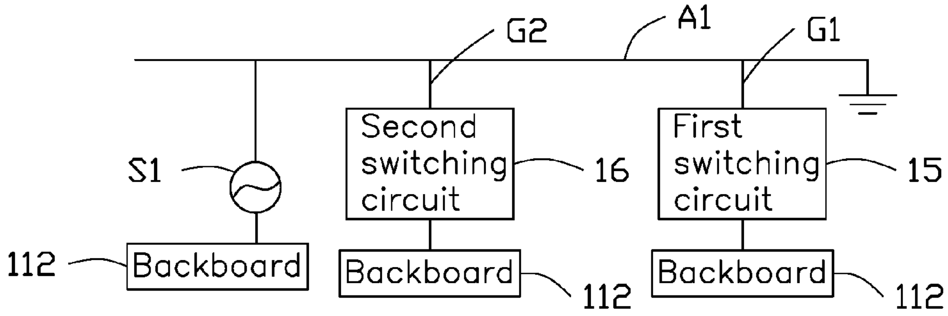
FIG. 4 is a circuit diagram of the antenna structure of FIG. 1.

Per FIG. 1 and FIG. 4, in other exemplary embodiments, the antenna structure 100 further includes a first switching circuit 15 and a second switching circuit 16. One end of the first switching circuit 15 is electrically connected to the first ground portion G1, thus the first switching circuit 15 is electrically connected to the long portion A1 through the first ground portion G1. Another end of the first switching circuit 15, electrically connected to backboard 112, is grounded. One end of the second switching circuit 16 is electrically connected to the second ground portion G2, thus the second switching circuit 16 is electrically connected to the long portion A1 through the second ground portion G2. Another end of the second switching circuit 16 is electrically connected to backboard 112, and thus is grounded.

Figure 5:
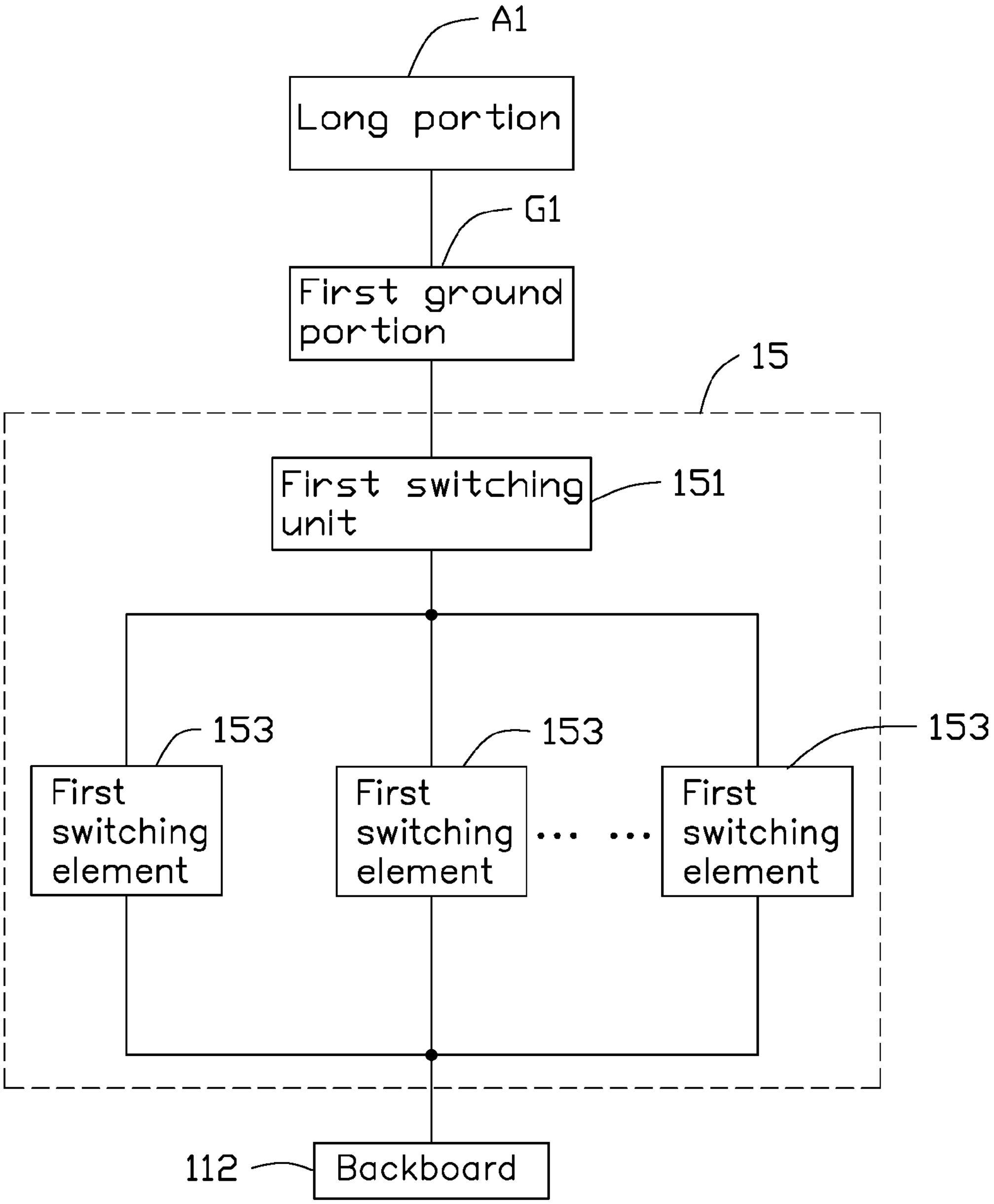
FIG. 5 is a circuit diagram of a first switching circuit of the antenna structure of FIG. 1.

Per FIG. 5, the first switching circuit 15 includes a first switching unit 151 and a plurality of first switching elements 153. The first switching unit 151 is electrically connected to the first ground portion G1 and is electrically connected to the long portion A1 through the first ground portion G1. The first switching elements 153 can be an inductor, a capacitor, or a combination of the inductor and the capacitor.

The first switching elements 153 are connected in parallel to each other. One end of each first switching element 153 is electrically connected to the first switching unit 151. The other end of each first switching element 153 is electrically grounded to the backboard 112.

Figure 6:
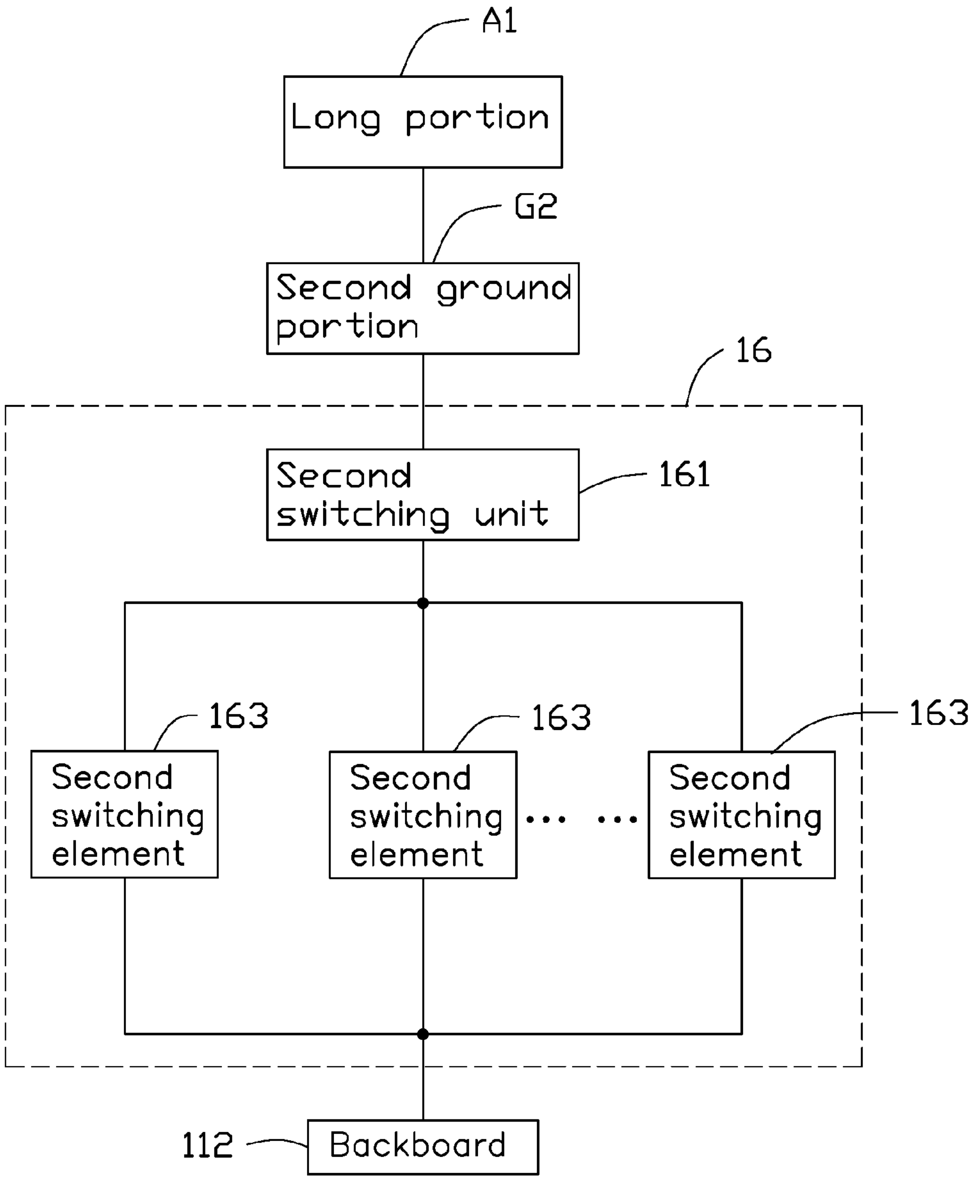
FIG. 6 is a circuit diagram of a second switching circuit of the antenna structure of FIG. 1.

Per FIG. 6, the second switching circuit 16 includes a second switching unit 161 and a plurality of second switching elements 163. The second switching unit 161 is electrically connected to the second ground portion G2 and is electrically connected to the long portion A1 through the second ground portion G2. The second switching elements 163 can be an inductor, a capacitor, or a combination of the inductor and the capacitor. The second switching elements 163 are connected in parallel to each other. One end of each second switching element 163 is electrically connected to the second switching unit 161. The other end of each second switching element 163 is electrically grounded to the backboard 112.

Through controlling the first switching unit 151 and the second switching unit 161, the long portion A1 can be switched to connect with different first switching elements 153 and/or second switching elements 163. Since each first switching element 153 and second switching element 163 has a different impedance, an operating frequency band of the first operation mode of the long portion A1 can be adjusted through switching the first switching unit 151 and the second switching unit 161. For example, the frequency band of the first mode of the long portion A1 can be offset towards a lower frequency or towards a higher frequency (relative to each other).

In this exemplary embodiment, the first switching circuit 15 and the second switching circuit 16 can be switched independently or together. The first switching circuit 15 is mainly used to switch a low frequency band of the first frequency band (704-787 MHz and 824-960 MHz). The second switching circuit 16 is mainly used to switch a middle frequency band and a high frequency band of the first frequency band (1710-2690 MHz).

In other exemplary embodiments, the wireless communication device 200 further includes a shielding mask or a middle frame (not shown). The shielding mask is positioned at the surface of the display 201 towards the backboard 112 and is configured for shielding against electromagnetic interference. The middle frame is positioned at the surface of the display 201 towards the backboard 112 and is configured for supporting the display 201. The shielding mask or the middle frame is made of metallic material. The shielding mask or the middle frame is electrically connected to the backboard 112 and serves as ground of the antenna structure 100 and the wireless communication device 200. A ground point can be electrically connected to the shielding mask, the middle frame, or the backboard 112.

Figure 7:
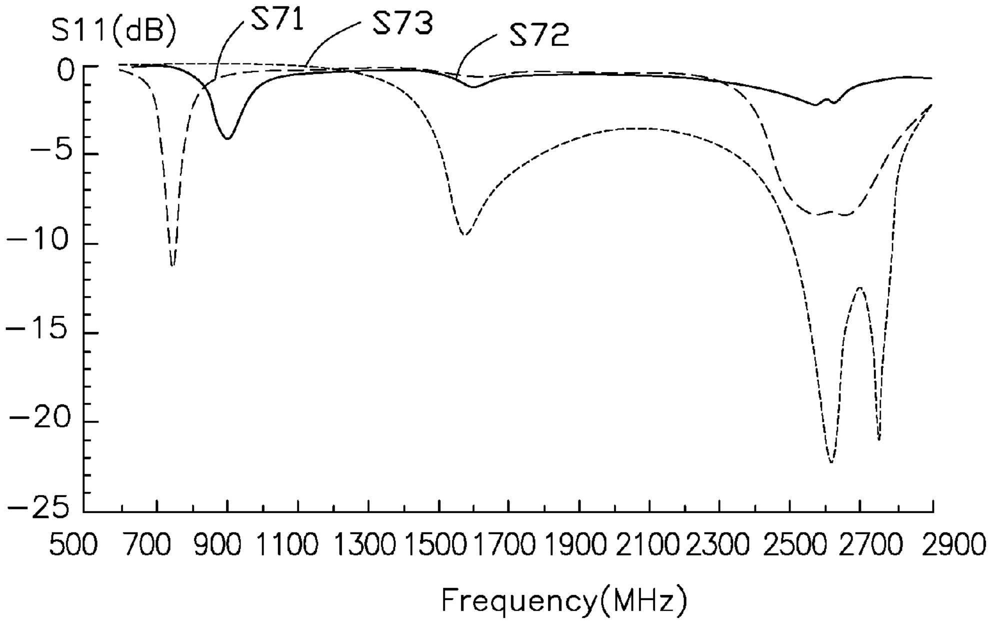
FIG. 7 is a scattering parameter graph when the antenna structure of FIG. 1 works at a first operation mode.

FIG. 7 illustrates a scattering parameter graph of the antenna structure 100, when the antenna structure 100 works at the first operation mode. Curve 71 illustrates a scattering parameter when the antenna structure 100 works at an LTE-A Band 17/13 (704-787 MHz). Curve 72 illustrates a scattering parameter when the antenna structure 100 works at an LTE-A Band 5/8 (824-960 MHz). Curve 73 illustrates a scattering parameter when the antenna structure 100 works at a frequency band of about 1710-2690 MHz.

Figure 8:
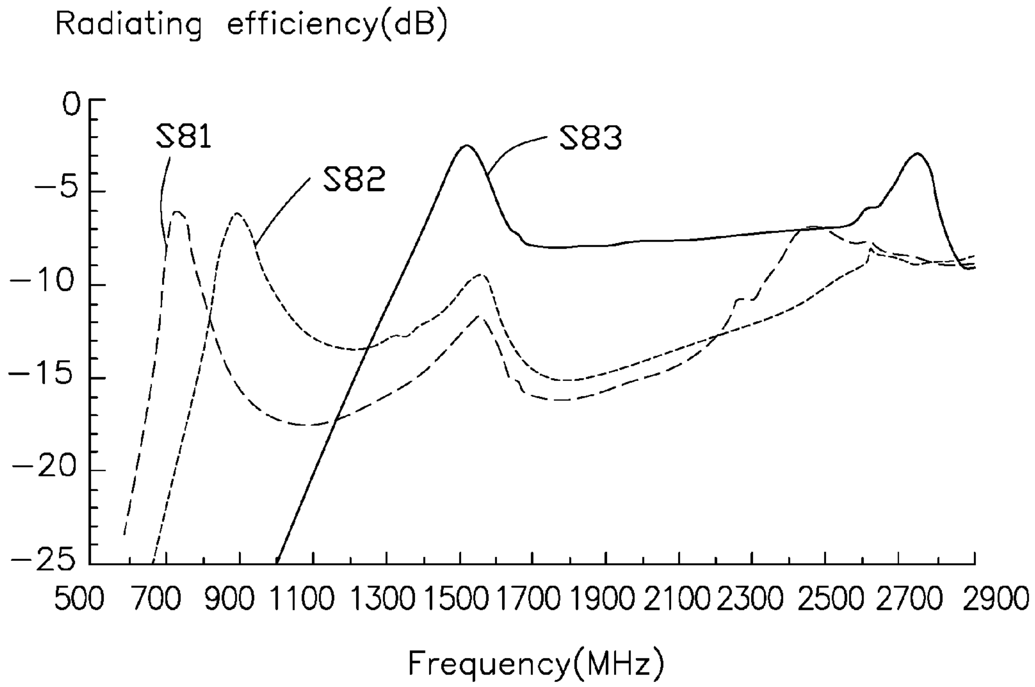
FIG. 8 is a radiating efficiency graph when the antenna structure of FIG. 1 works at a first operation mode.

FIG. 8 illustrates a radiating efficiency graph of the antenna structure 100, when the antenna structure 100 works at the first operation mode. Curve 81 illustrates a radiating efficiency when the antenna structure 100 works at an LTE-A Band 17/13 (704-787 MHz). Curve 82 illustrates a radiating efficiency when the antenna structure 100 works at an LTE-A Band 5/8 (824-960 MHz). Curve 83 illustrates a radiating efficiency when the antenna structure 100 works at a frequency band of about 1710-2690 MHz.

Figure 9:
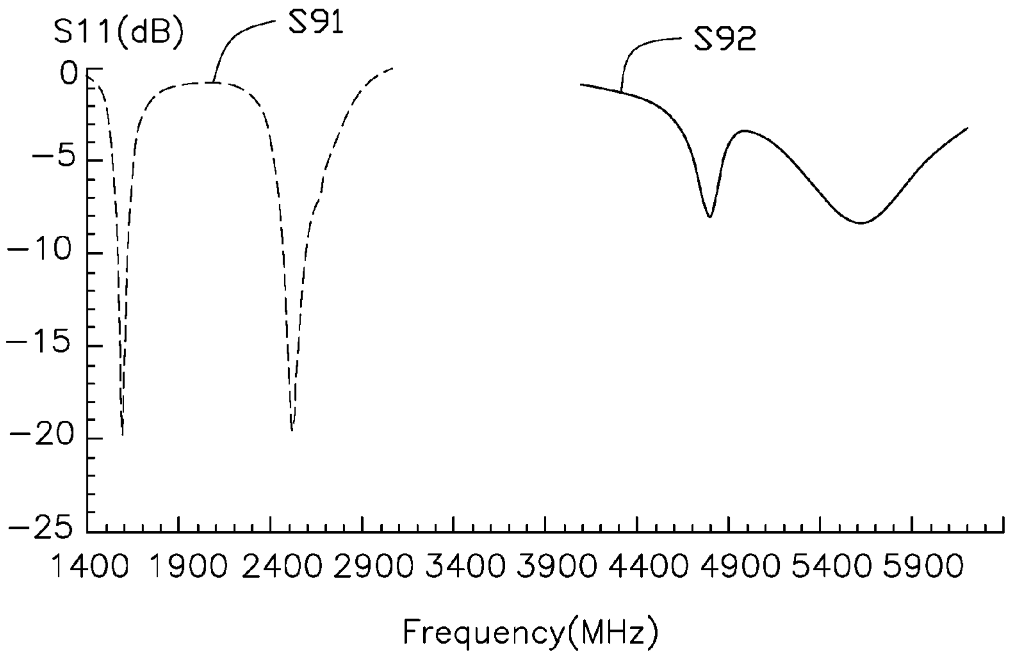
FIG. 9 is a scattering parameter graph when the antenna structure of FIG. 1 works at a Global Positioning System (GPS) operation mode, a WIFI 2.4G mode, and a WIFI 5G mode.

FIG. 9 illustrates a scattering parameter graph of the antenna structure 100, when the antenna structure 100 works at the GPS operation mode, WIFI 2.4G operation mode, and WIFI 5G operation mode. Curve 91 illustrates a scattering parameter when the antenna structure 100 works at the GPS band and the WIFI 2.4G band. Curve 92 illustrates a scattering parameter when the antenna structure 100 works at the WIFI 5G band.

Figure 10:
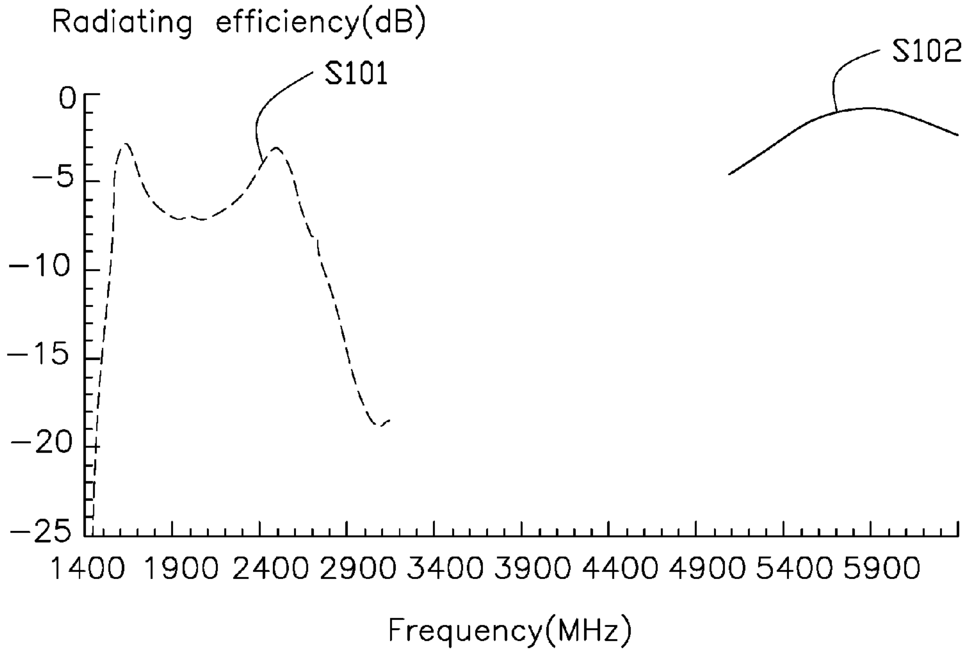
FIG. 10 is a radiating efficiency graph when the antenna structure of FIG. 1 works at a GPS operation mode, a WIFI 2.4G mode, and a WIFI 5G mode.

FIG. 10 illustrates a radiating efficiency graph of the antenna structure 100, when the antenna structure 100 works at the GPS operation mode, WIFI 2.4G operation mode, and WIFI 5G operation mode. Curve 101 illustrates a radiating efficiency when the antenna structure 100 works at the GPS band and the WIFI 2.4G band. Curve 102 illustrates a radiating efficiency when the antenna structure 100 works at the WIFI 5G band.

Per FIGS. 7 to 10, the antenna structure 100 can work at a low frequency band, for example, LTE-A band 17/13/5/8. The antenna structure 100 can also work at LTE-A middle and high frequency bands of about 1710-2690 MHz, the GPS band (1.575 GHz), the WIFI 2.4G band, and the WIFI 5G band. When the antenna structure 100 works at these frequency bands, a working frequency satisfies a design target of the antenna and also has a good radiating efficiency.

As described above, the antenna structure 100 defines the slot 118 and the gap 119, then the housing 11 is divided into a long portion A1. The antenna structure 100 further includes the first feed portion S1, the first ground portion G1, and the second ground portion G2. The long portion A1 can activate a first operation mode to generate radiation signals in low, middle, and high frequency bands. The wireless communication device 200 can use carrier aggregation (CA) technology of LTE-A to receive or send wireless signals at multiple frequency bands simultaneously. In detail, the wireless communication device 200 can use the CA technology and use the long portion A1 to receive or send wireless signals at multiple frequency bands simultaneously.

In addition, the antenna structure 100 includes the housing 11. The slot 118 and the gap 119 are both defined on the front frame 111 and the side frame 113 instead of the backboard 112. Then the backboard 112 forms an all-metal structure. That is, the backboard 112 does not define any slot and/or gap thereon and therefore has a good structural integrity and an aesthetic quality.

Exemplary Embodiment 2

Figure 11:
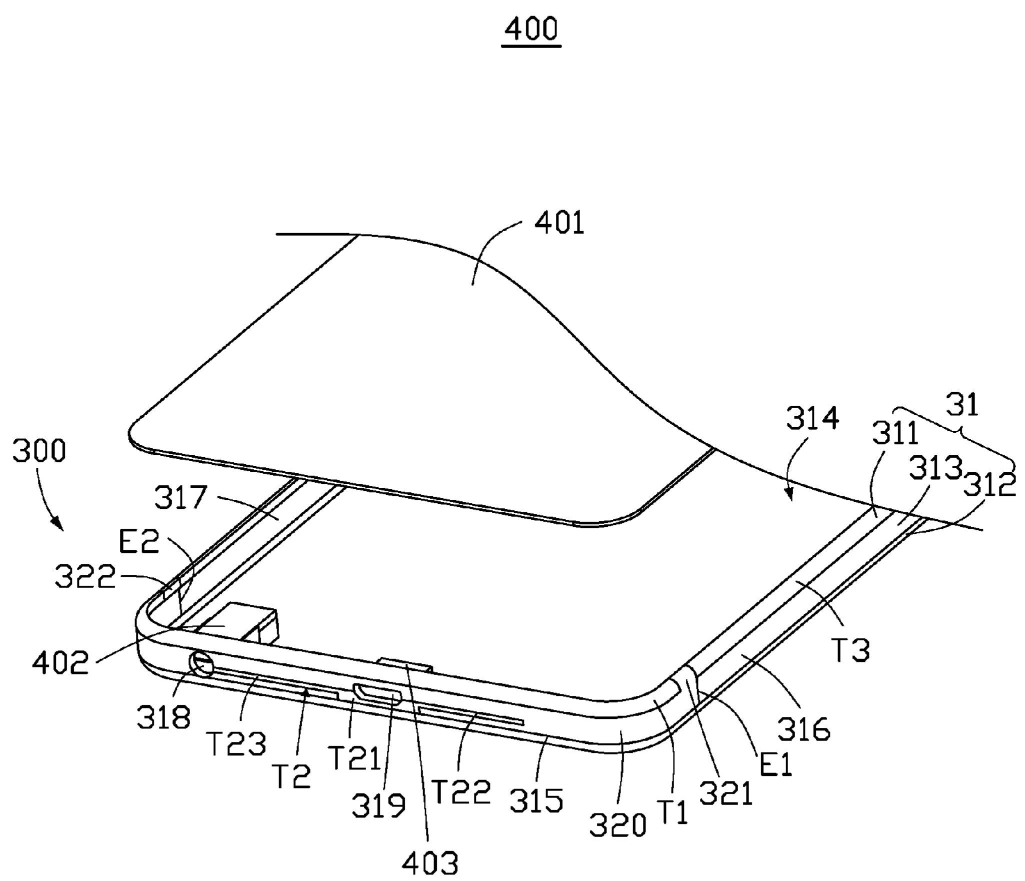
FIG. 11 is an isometric view of a second exemplary embodiment of a wireless communication device using a second exemplary antenna structure.

FIG. 11 illustrates an embodiment of a wireless communication device 400 using a second exemplary antenna structure 300. The wireless communication device 400 can be a mobile phone or a personal digital assistant, for example. The antenna structure 300 can receive and send wireless signals.

Figure 12:
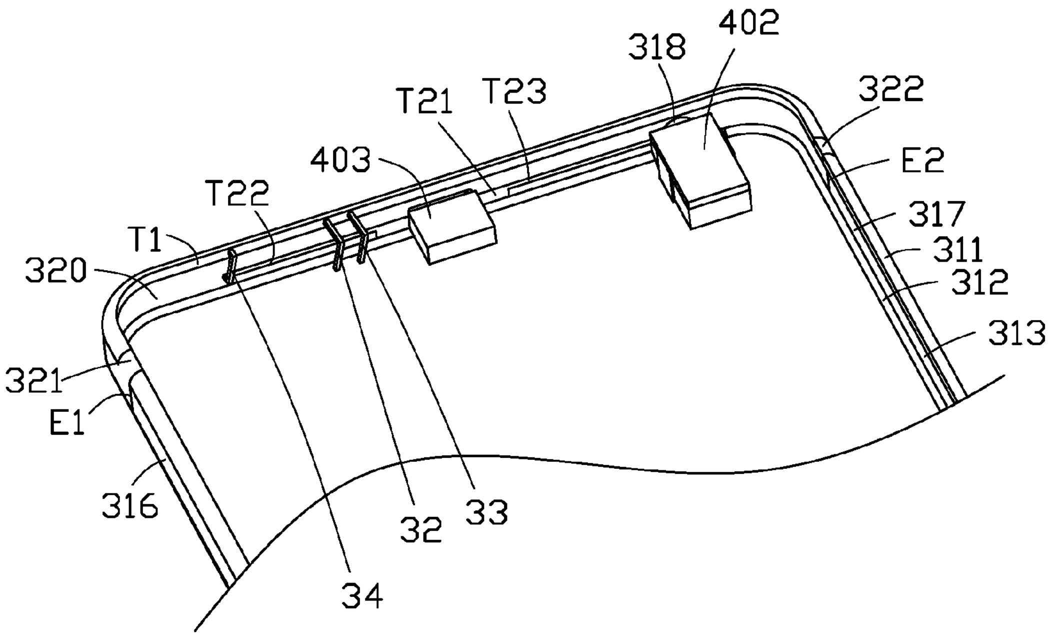
FIG. 12 is similar to FIG. 11, but shown from another angle.

Per FIG. 12, the antenna structure 300 includes a housing 31, a feed portion 32, and a ground portion 33. The housing 31 can be a metal housing of the wireless communication device 400. In this exemplary embodiment, the housing 31 is a frame structure and is made of metallic material. The housing 31 includes a front frame 311, a backboard 312, and a side frame 313. The front frame 311, the backboard 312, and the side frame 313 can be integral with each other. The front frame 311, the backboard 312, and the side frame 313 cooperatively form the metal housing of the wireless communication device 400.

The front frame 311 defines an opening (not shown). The wireless communication device 400 includes a display 401. The display 401 is received in the opening. The display 401 has a display surface. The display surface is exposed at the opening and is positioned parallel to the backboard 312.

The backboard 312 is positioned opposite to the front frame 311. The backboard 312 is directly connected to the side frame 313 and there is no gap between the backboard 312 and the side frame 313. In this exemplary embodiment, the backboard 312 serves as ground connection of the antenna structure 300 and the wireless communication device 400.

The side frame 313 is positioned between the front frame 311 and the backboard 312. The side frame 313 is positioned around a periphery of the front frame 311 and a periphery of the backboard 312. The side frame 313 forms a receiving space 314 together with the display 401, the front frame 311, and the backboard 312. The receiving space 314 can receive a printed circuit board, a processing unit, or other electronic components or modules.

The side frame 313 includes an end portion 315, a first side portion 316, and a second side portion 317. In this exemplary embodiment, the end portion 315 is a bottom portion of the wireless communication device 400. The end portion 315 connects the front frame 311 and the backboard 312. The first side portion 316 is positioned apart from and parallel to the second side portion 317. The end portion 315 has first and second ends. The first side portion 316 is connected to the first end of the first frame 311 and the second side portion 317 is connected to the second end of the end portion 315. The first side portion 316 connects the front frame 311 and the backboard 312. The second side portion 317 also connects the front frame 311 and the backboard 312.

The side frame 313 defines a first through hole 318, a second through hole 319, and a slot 318. The front frame 311 defines a first gap 321 and a second gap 322.

In this exemplary embodiment, the first through hole 318 and the second through hole 319 are both defined on the end portion 315. The first through hole 318 and the second through hole 319 are spaced apart from each other and both pass through the end portion 315.

Figure 13:
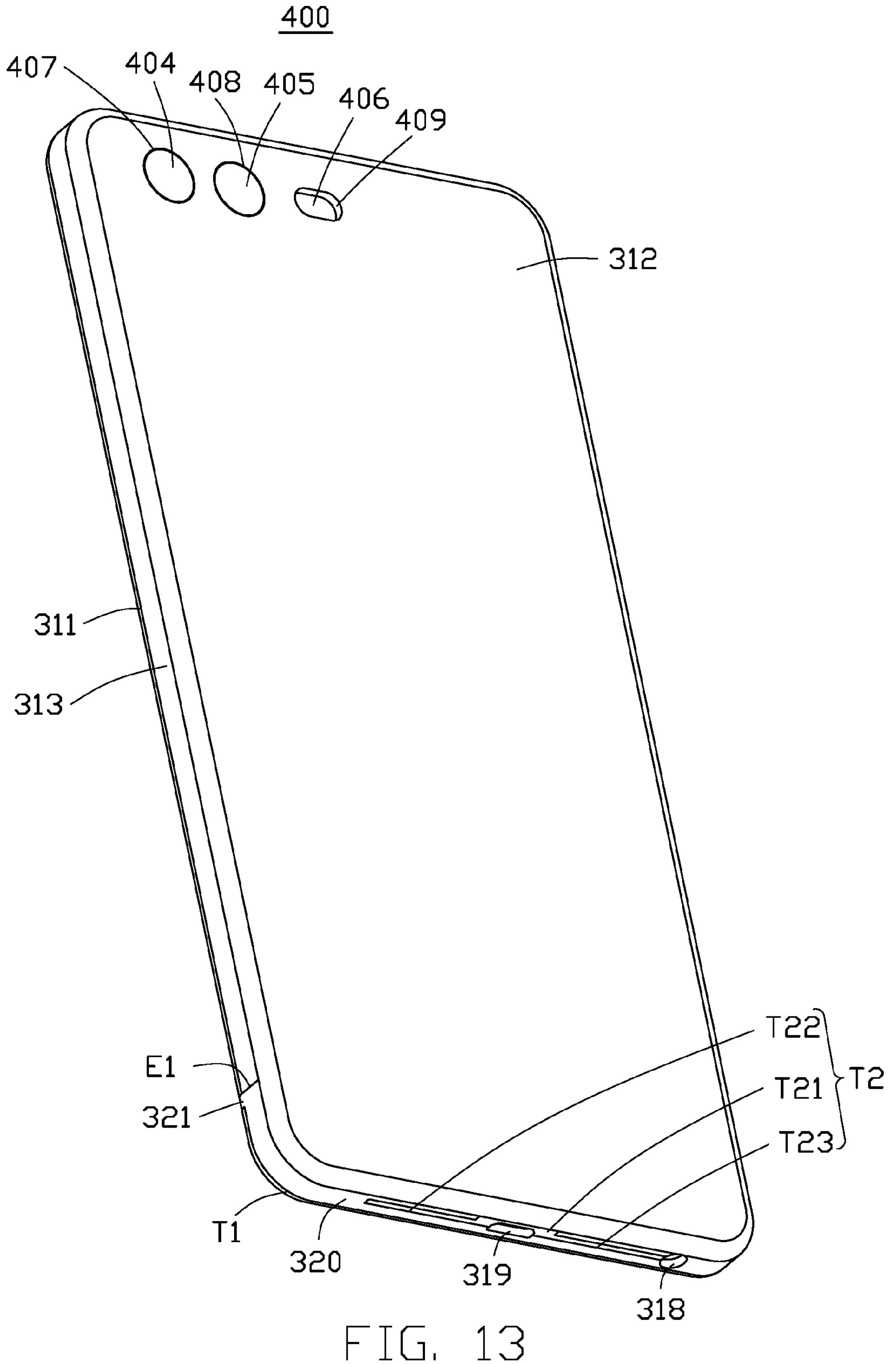
FIG. 13 is an assembled, isometric view of the wireless communication device of FIG. 11.

Per FIG. 12 and FIG. 13, the wireless communication device 400 includes at least one electronic element. In this exemplary embodiment, the wireless communication device 400 includes a first electronic element 402, a second electronic element 403, a third electronic element 404, a fourth electronic element 405, and a fifth electronic element 406. In this exemplary embodiment, the first electronic element 402 is an earphone interface module. The first electronic element 402 is positioned in the receiving space 314 and is positioned adjacent to the second side portion 317. The first electronic element 402 corresponds to the first through hole 318 and is partially exposed from the first through hole 318. An earphone can thus be inserted in the first through hole 318 and be electrically connected to the first electronic element 402.

The second electronic element 403 is a Universal Serial Bus (USB) module. The second electronic element 403 is positioned in the receiving space 314 and is positioned between the first electronic element 402 and the second side portion 317.

The second electronic element 403 corresponds to the second through hole 319 and is partially exposed from the second through hole 319. A USB device can be inserted in the second through hole 319 and be electrically connected to the second electronic element 403. The third electronic element 404 and the fourth electronic element 405 are both rear camera modules. The fifth electronic element 406 is a flash light.

In this exemplary embodiment, the backboard 312 is an integral and single metallic sheet. Except the holes 407, 408, and 409 for exposing two camera lenses (that is, the third electronic element 404 and the fourth electronic element 405) and the flash light (that is, the fifth electronic element 406), the backboard 312 does not define any other slot, break line, and/or gap.

In this exemplary embodiment, the slot 320 is defined at the end portion 315 and extends to the first side portion 316 and the second portion 317. The slot 320 communicates with the first through hole 318 and the second through hole 319. In other exemplary embodiments, the slot 320 can only be defined at the end portion 315 and does not extend to any one of the first side portion 316 and the second portion 317. In other exemplary embodiments, the slot 320 can be defined at the end portion 315 and extends to one of the first side portion 316 and the second portion 317.

The first gap 321 and the second gap 322 both communicate with the slot 320 and extend across the front frame 311. In this exemplary embodiment, the first gap 321 is defined on the front frame 311 and communicates with a first end E1 of the slot 320 positioned on the first side portion 316. The second gap 322 is defined on the front frame 311 and communicates with a second end E2 of the slot 320 positioned on the second side portion 317. The front frame 311 is divided into two portions by the slot 320, the first gap 321, and the second gap 322, these portions being a first radiating portion T1 and a second radiating portion T2. The portion of the front frame 311 surrounded by the slot 320, the first gap 321, and the second gap 322 forms the first radiating portion T1. The portion of the side frame 313 surrounded by the slot 320 and the backboard 312 forms the second radiating portion T2. In this exemplary embodiment, the first radiating portion T1 and the second radiating portion T2 both form antenna structures for receiving and sending wireless signals.

In this exemplary embodiment, the second radiating portion T2 is substantially T-shaped and is part of the end portion 315. The second radiating portion T2 includes a connecting section T21, a first radiating section T22, and a second radiating section T23. The connecting section T21 is substantially rectangular and is positioned between the first radiating portion T1 and the backboard 312. The first radiating section T22 is perpendicularly connected to the side of the connecting section T21 adjacent to the first side portion 316 and extends along a direction parallel to the end portion 315 towards the first side portion 316. The second radiating section T23 is substantially rectangular. The second radiating section T23 is positioned between the first radiating portion T1 and the backboard 312. The second radiating section T23 is perpendicularly connected to a junction between the connecting section T21 and the first radiating section T22 and extends along a direction parallel to the end portion 315 towards the second side portion 317. The second radiating section T23 is collinear with the first radiating section T22. The connecting section T21, the first radiating section T22, and the second radiating section T23 cooperatively form a T-shaped structure.

In this exemplary embodiment, the slot 320, the first gap 321, and the second gap 322 are all filled with insulating material, for example, plastic, rubber, glass, wood, ceramic, or the like, thereby isolating the first radiating portion T1 and the other parts of the housing 31.

In this exemplary embodiment, the slot 320 is defined on the end of the side frame 313 adjacent to the backboard 312 and extends to the front frame 311. Then the first radiating portion T1 is fully formed by a portion of the front frame 311. In other exemplary embodiments, a position of the slot 320 can be adjusted. For example, the slot 320 can be defined on the end of the side frame 313 adjacent to the backboard 312 and extend towards the front frame 311. Then the first radiating portion T1 is formed by a portion of the front frame 311 and a portion of the side frame 313.

In this exemplary embodiment, a distance from the first radiating section T22 and the second radiating section T23 to the front frame 311 is about 1.83 mm. A width of the first radiating section T22 and the second radiating section T23 is about 1 mm. A distance from the first radiating section T22 and the second radiating section T23 to the backboard 312 is about 1 mm.

Per FIG. 12, the feed portion 12 is positioned in the receiving space 314 between the second electronic element 403 and the first side portion 316. One end of the feed portion 12 is electrically connected to the first radiating portion T1 for feeding current to the first radiating portion T1. Another end of the feed portion 12 is electrically grounded to the backboard 312.

The ground portion 33 is positioned in the receiving space 314 between the second electronic element 403 and the feed portion 12. One end of the ground portion 33 is electrically connected to the first radiating portion T1 for grounding the first radiating portion T1. Another end of the ground portion 33 is electrically grounded to the backboard 312.

Per FIG. 12, in other exemplary embodiments, the antenna structure 300 further includes a connecting portion 34. The connecting portion 34 is positioned between the receiving space 314 and is positioned adjacent to the first side portion 316.

One end of the connecting portion 34 is electrically connected to the first radiating portion T1. Another end of the connecting portion 34 is electrically connected to first radiating section T22 for electrically connecting the first radiating portion T1 and the first radiating section T22. The connecting portion 34 effectively adds the radiating length of the first radiating portion T1. Then the first radiating portion T1 can operate at low and middle frequency bands. The connecting portion 34 also adjusts a capacitive reactance and an inductive reactance of the antenna structure 300. Then the antenna structure 300 has wideband characteristics. In this exemplary embodiment, the connecting portion 34 is a Flexible Printed Circuit Board (FPCB). A frequency band of the antenna structure 300 can be adjusted by changing the connecting portion 34, the structures of the first radiating portion T1 and the second radiating portion T2 do not need to be changed.

Figure 15:
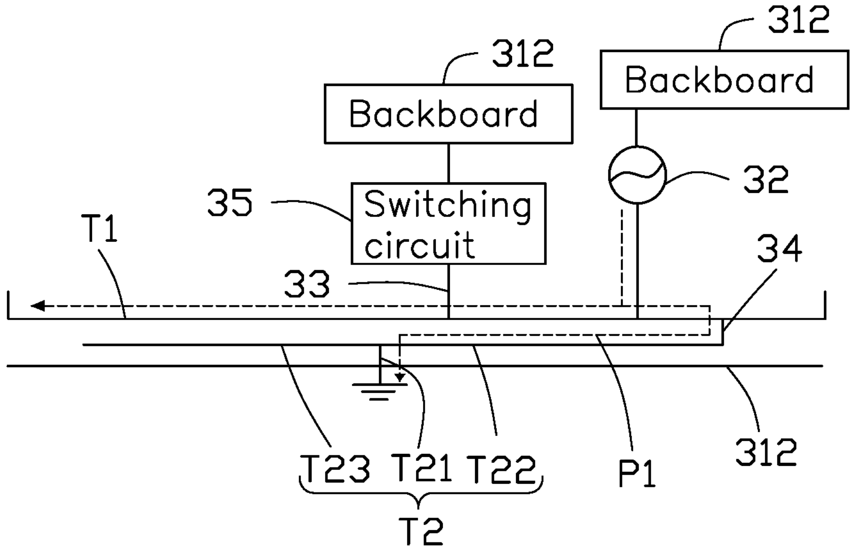

Per FIG. 15, when the current enters from the feed portion 32, the current flows through the first radiating portion T1 and flows to the first radiating section T22 through the connecting portion 34. The current is further grounded through the connecting section T21 and the backboard 312. Then the first radiating portion T1, the connecting portion 34, and the first radiating section T22 cooperatively activate a first operation mode for generating radiation signals in a first frequency band (the path P1). In this exemplary embodiment, the first operation mode is LTE-A low and middle frequency modes. The first frequency band includes frequency bands of about 704-960 MHz and 1710-2300 MHz. A resonance current path of the LTE-A low frequency band includes the first radiating portion T1. A resonance current path of the LTE-A middle frequency band only includes the portion of the first radiating portion T1 from the feed portion 32 to the first gap 321.

Figure 16:
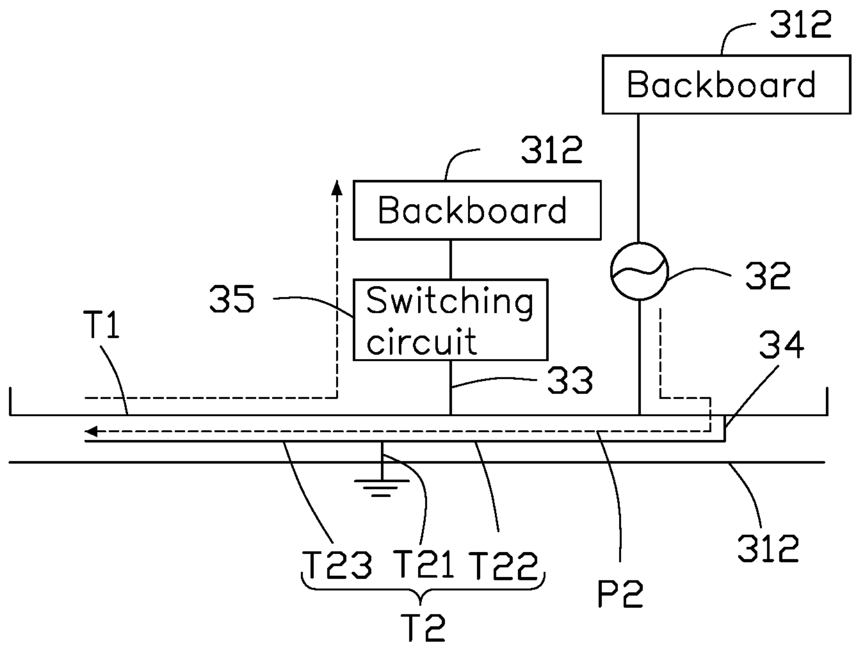

Per FIG. 16, when the current enters from the feed portion 32, the current flows through the portion of the first radiating portion T1 adjacent to the connecting portion 34 and flows to the first radiating section T22 and the second radiating section T23 through the connecting portion 34. The current is further coupled to the first radiating portion T1 through the second radiating section T23 and is grounded through the ground portion 33. Then the first radiating portion T1 and the second radiating section T23 cooperatively activate a second operation mode for generating radiation signals in a second frequency band (Per the path P2). In this exemplary embodiment, the second operation mode is an LTE-A high frequency band. The second frequency band includes a frequency band of about 2500-2690 MHz.

Figure 14:
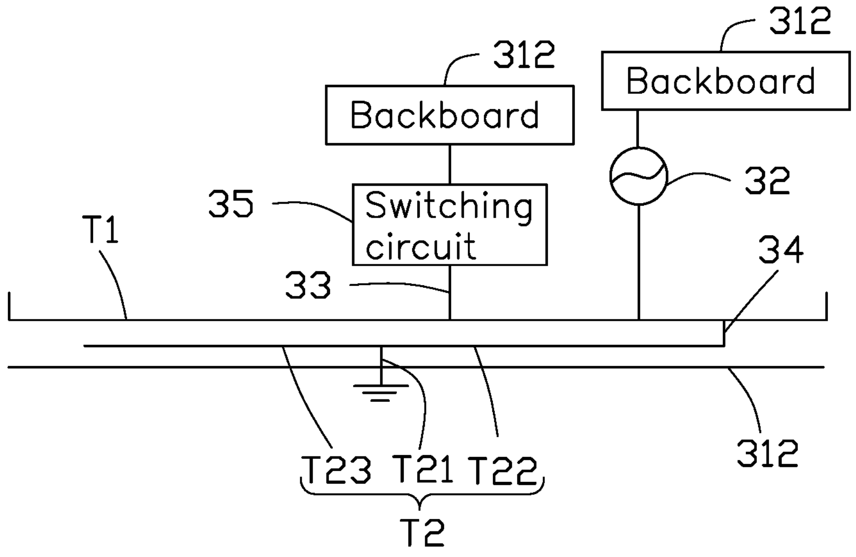
FIG. 14 is a circuit diagram of the antenna structure of FIG. 11.

Per FIG. 12 and FIG. 14, in other exemplary embodiments, the antenna structure 300 further includes a switching circuit 35. The switching circuit 35 is positioned in the receiving space 314. One end of the switching circuit 35 is electrically connected to the ground portion 33, thus the switching circuit 35 is electrically connected to the first radiating portion T1 through the ground portion 33. Another end of the switching circuit 35 is electrically grounded to backboard 312.

Figure 17:
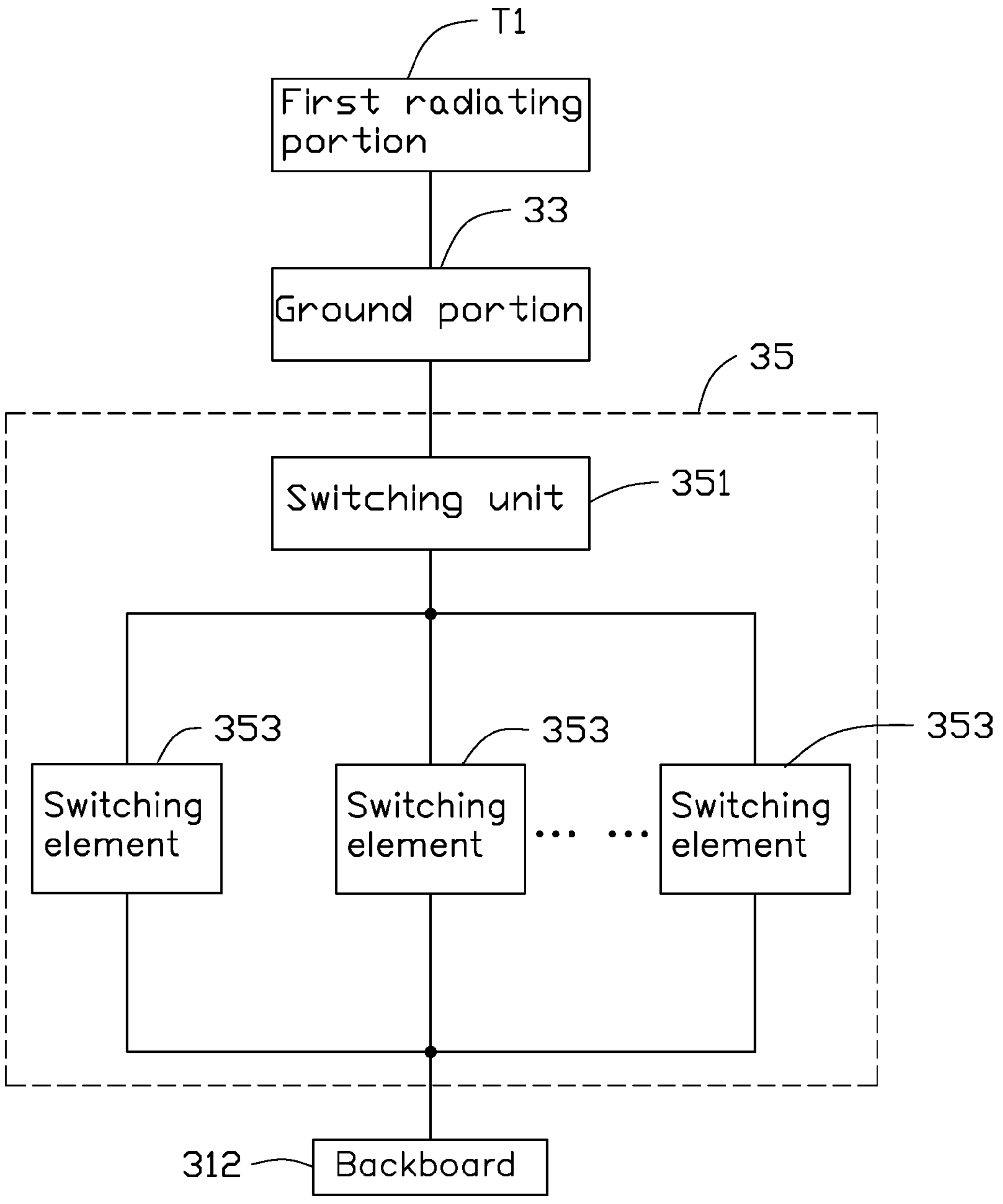
FIG. 17 is a circuit diagram of a switching circuit of the antenna structure of FIG. 11.

Per FIG. 17, the switching circuit 35 includes a switching unit 351 and a plurality of switching elements 353. The switching unit 351 is electrically connected to the first radiating portion T1 through the ground portion 33. The switching elements 353 can be an inductor, a capacitor, or a combination of the inductor and the capacitor. The switching elements 353 are connected in parallel. One end of each switching element 353 is electrically connected to the switching unit 351. The other end of each switching element 353 is electrically grounded to the backboard 312. Through controlling the switching unit 351, the first radiating portion T1 can be switched to connect with different switching elements 353. Since each switching element 353 has a different impedance, an operating frequency band of the antenna structure 300 can be adjusted through switching the switching unit 351.

In other exemplary embodiments, the wireless communication device 400 further includes a shielding mask or a middle frame (not shown). The shielding mask is positioned at the surface of the display 401 towards the backboard 312 and shields against electromagnetic interference. The middle frame is positioned at the surface of the display 401 towards the backboard 312 and is configured for supporting the display 401. The shielding mask or the middle frame is made of metallic material. The shielding mask or the middle frame is electrically connected to the backboard 312 and serves as the ground of the antenna structure 300 and the wireless communication device 400. In above grounding points, the shielding mask or the middle frame can replace the backboard 312 for grounding purposes.

Figure 18:
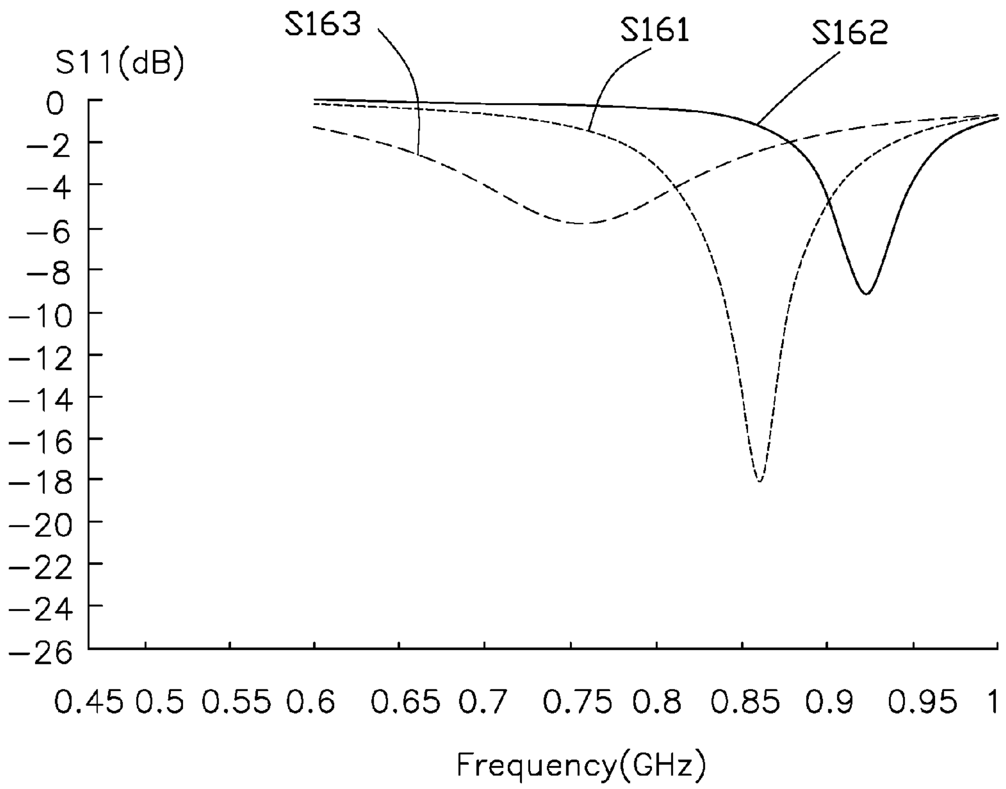
FIGS. 18 and 19 are scattering parameter graphs of the antenna structure of FIG. 11.
Figure 19:
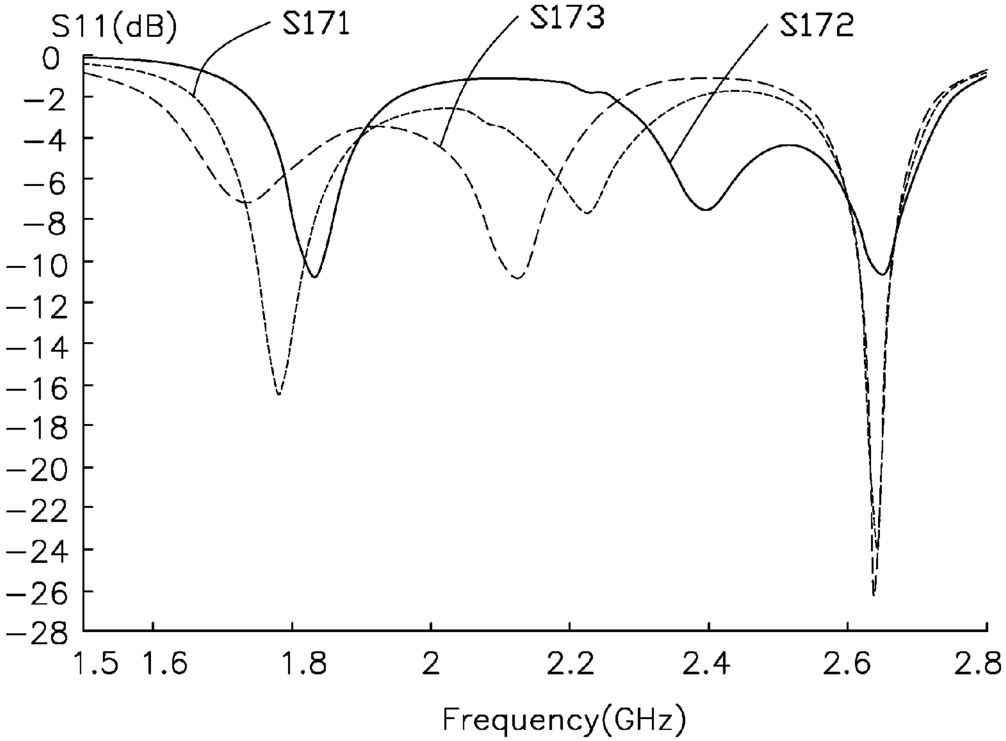

FIG. 18 and FIG. 19 illustrate a scattering parameter graph of the antenna structure 300. Curve 161 and curve 171 illustrate a scattering parameter when the antenna structure 300 works at a first mode, in frequency bands of about 824-894 MHz and 1710-1880 MHz. Curve 162 and curve 172 illustrate a scattering parameter when the antenna structure 300 works at a second mode, in frequency bands of about 880-960 MHz and 2300-2400 MHz. Curve 163 illustrates a scattering parameter when the antenna structure 300 works at a third mode, in a frequency band of about 703-803 MHze. Curve 173 illustrates a scattering parameter when the antenna structure 300 works at a fourth mode, in a frequency band of about 1710-2170 MHz.

Figure 20:
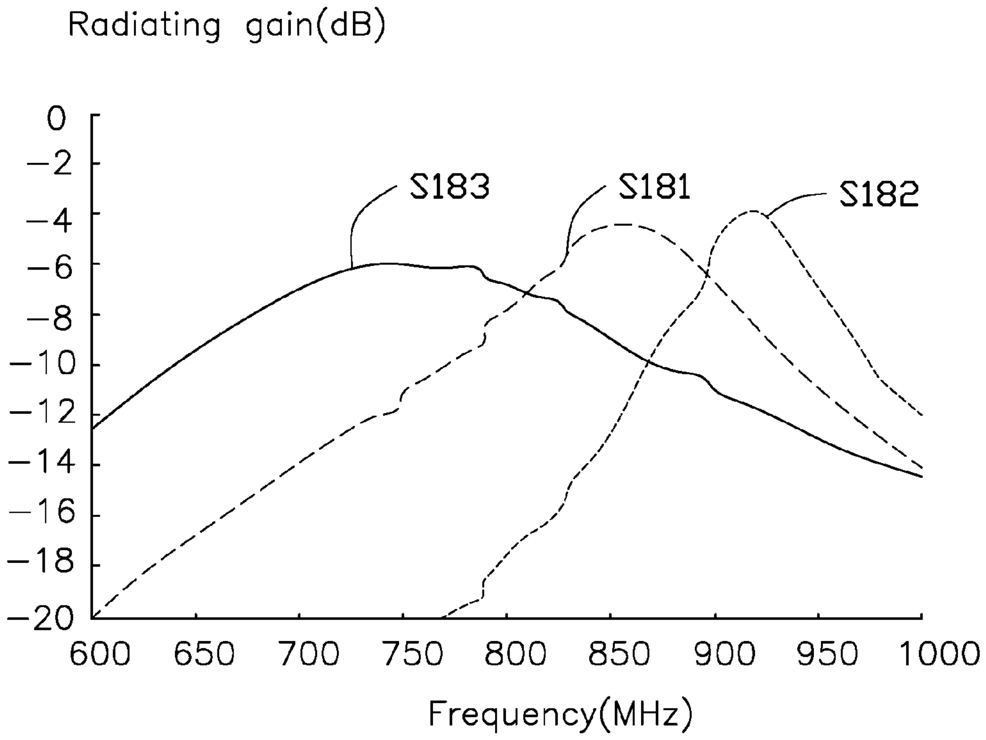
FIGS. 20 and 21 are radiation gain graphs of the antenna structure of FIG. 11.
Figure 21:
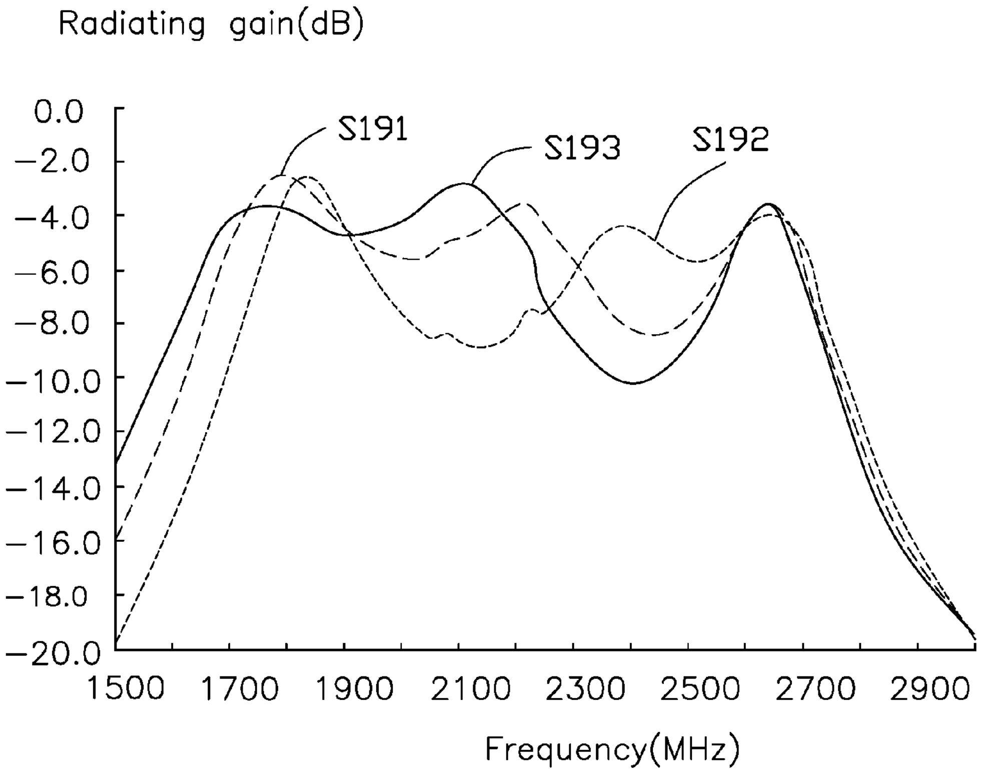

FIG. 20 and FIG. 21 illustrate a radiating gain graph of the antenna structure 300. Curve 181 and curve 191 illustrate a radiating gain when the antenna structure 300 works at the first mode, in frequency bands of about 824-894 MHz and 1710-1880 MHz. Curve 182 and curve 192 illustrate a radiating gain when the antenna structure 300 works at the second mode, in frequency bands of about 880-960 MHz and 2300-2400 MHz. Curve 183 illustrates a radiating gain when the antenna structure 300 works at the third mode, in a frequency band of about 703-803 MHz. Curve 193 illustrates a radiating gain when the antenna structure 300 works at the fourth mode, in a frequency band of about 1710-2170 MHz.

Per FIGS. 18 to 21, the antenna structure 300 can work at a low frequency band, a middle frequency band, and a high frequency band, for respective frequencies of 704-960 MHz, 1710-2300 MHz, and 2500-2690 MHz. When the antenna structure 300 works at these frequency bands, a working frequency satisfies a design target of the antenna and also has a good radiating efficiency. Additionally, when the antenna structure 300 includes the switching circuit 35, since the first radiating portion T1 and the second radiating section T23 cooperatively control the high frequency band, the high frequency band of the antenna structure 300 is always activated, no matter which of the first to fourth modes the switching circuit 35 is switched to.

As described above, the antenna structure 300 defines the slot 320, the first gap 321, and the second gap 322, then the housing 31 is divided into the first radiating portion T1 and the second radiating portion T2. The antenna structure 300 further includes the feed portion 32, the connecting portion 34, and the switching circuit 35, then the antenna structure 300 can activate a first operation mode and a second operation mode to generate radiation signals in a low frequency band, a middle frequency band, and a high frequency band. The wireless communication device 400 can use carrier aggregation (CA) technology of LTE-A to receive and send wireless signals at multiple frequency bands simultaneously. In detail, the wireless communication device 400 can use the CA technology and use the first radiating portion T1 and the second radiating portion T2 to receive and send wireless signals at multiple frequency bands simultaneously.

In addition, the antenna structure 300 includes the housing 31. The slot 320, the first gap 321, and the second gap 322 are all defined on the front frame 311 and the side frame 313 instead of on the backboard 312. Then the backboard 312 forms a single all-metal structure. That is, the backboard 312 does not define any other slot and/or gap and has a good integrity structural and an aesthetic quality.

The antenna structure 100 of exemplary embodiment 1 and the antenna structure 300 of exemplary embodiment 2 can both be applied to one wireless communication device. For example, the antenna structure 100 can serve as an upper antenna of the wireless communication device and the antenna structure 300 can serve as a lower antenna of the wireless communication device. When the wireless communication device sends wireless signals, the wireless communication device can use the antenna structure 300 to send wireless signals. When the wireless communication device receives wireless signals, the wireless communication device can use the antenna structure 100 and antenna structure 300 to receive wireless signals.

The embodiments shown and described above are only examples. Many details are often found in the art such as the other features of the antenna structure and the wireless communication device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure comprising:

a metal housing, the metal housing comprising a front frame, a backboard, and a side frame, the side frame being positioned between the front frame and the backboard, the backboard being grounded; wherein the side frame defines a slot and the front frame defines a gap, the gap communicates with the slot and extends across the front frame; the metal housing is divided into at least a long portion and a short portion by the slot and the gap; and a first feed portion, one end of the first feed portion electrically connected to the long portion for feeding current to the long portion and another end of the first feed portion electrically connected to the backboard;

a first ground portion, one end of the first ground portion electrically connected to the long portion for grounding the long portion and another end of the first ground portion electrically connected to the backboard;

a second ground portion, one end of the second ground portion electrically connected to the long portion for grounding the long portion and another end of the second ground portion electrically connected to the backboard; and a radiator;

wherein the radiator is positioned in the metal housing, electrically connected to the backboard, and is spaced apart from the short portion.

2. The antenna structure of claim 1, wherein the slot and the gap are both filled with insulating material.

3. The antenna structure of claim 1, wherein the radiator comprises a second feed portion, a first radiating portion, a second radiating portion, and a third ground portion, one end of the second feed portion is electrically connected to the first radiating portion and the second radiating portion for feeding current to the first radiating portion and the second radiating portion, another end of the second feed portion is electrically connected to backboard; the third ground portion is positioned adjacent to the gap and is spaced apart from the second feed portion; one end of the third ground portion is electrically connected to the second radiating portion and another end of the third ground portion is electrically connected to backboard; the first radiating portion and the second radiating portion are both spaced apart from the short portion.

4. The antenna structure of claim 3, wherein the side frame comprises an end portion, a first side portion, and a second side portion, the first side portion and the second side portion are respectively connected to two ends of the end portion; the slot is at least defined on the end portion, the first radiating portion is electrically connected to the end of the second feed portion away from the backboard and extends along a direction parallel to the end portion and towards the first side portion; the second radiating portion comprises a first radiating section and a second radiating section, one end of the first radiating section is electrically connected to a junction of the second feed portion and the first radiating portion, another end of the first radiating section extends along a direction parallel to the second side portion and towards the short portion; the second radiating section is electrically connected to the end of the first radiating section away from the second feed portion and extends along a direction parallel to the end portion and towards the first side portion, until the second radiating section is electrically connected to the end of the third ground portion away from the backboard.

5. The antenna structure of claim 3, wherein a first portion of the front frame from a first side of the gap to a first end of the slot forms a long portion, when a current enters the long portion from the first feed portion, the current flows through the long portion and is grounded by the first ground portion, the second ground portion, and the position of the long portion adjacent to the first end to activate a first mode for generating radiation signals in a first frequency band, the first operation mode is an LTE-A low, middle, and high frequency modes.

6. The antenna structure of claim 5, wherein a second portion of the front frame from a second side of the gap to a second end of the slot forms the short portion, the first portion is longer than the short portion, when the current enters from the second feed portion, the current flows through the first radiating portion to activate a second operation mode for generating radiation signals in a second frequency band; when the current enters from the second feed portion, the current flows through the second radiating portion and is grounded by the third ground portion to activate a third operation mode for generating radiation signals in a third frequency band; when the current enters from the second feed portion, the current flows through the second radiating portion, is electronically coupled to short portion through the second radiating portion, and is grounded through the short portion to activate a fourth operation mode for generating radiation signals in a fourth frequency band; the second operation mode is a WIFI 2.4G operation mode, the third operation mode is a WIFI 5G operation mode, and the fourth operation mode is a GPS operation mode.

7. The antenna structure of claim 5, further comprising a first switching circuit and a second switching circuit, wherein the first switching circuit comprises a first switching unit and a plurality of first switching elements, the first switching unit is electrically connected to the long portion through the first ground portion, the first switching elements are connected in parallel to each other, one end of each first switching element is electrically connected to the first switching unit, and the other end of each first switching element is electrically connected to the backboard; the second switching circuit comprises a second switching unit and a plurality of second switching elements, the second switching unit is electrically connected to the long portion through the second ground portion, the second switching elements are connected in parallel to each other, one end of each second switching element is electrically connected to the second switching unit, and the other end of each second switching element is electrically connected to the backboard; and through controlling the first switching unit and/or the second switching unit to switch, the long portion is switched to different first switching elements and/or second switching elements and the first frequency band is adjusted.

8. The antenna structure of claim 1, wherein a wireless communication device uses the long portion to receive or send wireless signals at multiple frequency bands simultaneously through carrier aggregation (CA) technology of Long Term Evolution Advanced (LTE-A).

9. The antenna structure of claim 1, wherein the backboard is an integral and single metallic sheet, the backboard is directly connected to the side frame and there is no gap formed between the backboard and the side frame, the backboard does not define any slot, break line, and/or gap for separating the backboard.

10. A wireless communication device comprising:

an antenna structure, the antenna structure comprising:

a metal housing, the metal housing comprising a front frame, a backboard, and a side frame, the side frame being positioned between the front frame and the backboard, the backboard being grounded; wherein the side frame defines a slot and the front frame defines a gap, the gap communicates with the slot and extends across the front frame; the metal housing is divided into at least a long portion and a short portion by the slot and the gap; and a first feed portion, one end of the first feed portion electrically connected to the long portion for feeding current to the long portion and another end of the first feed portion electrically connected to the backboard;

a first ground portion, one end of the first ground portion electrically connected to the long portion for grounding the long portion and another end of the first ground portion electrically connected to the backboard;

a second ground portion, one end of the second ground portion electrically connected to the long portion for grounding the long portion and another end of the second ground portion electrically connected to the backboard; and a radiator;

wherein the radiator is positioned in the metal housing, electrically connected to the backboard, and is spaced apart from the short portion.

11. The wireless communication device of claim 10, further comprising a display, wherein the front frame defines an opening, the display is received in the opening, a display surface of the display is exposed at the opening and is positioned parallel to the backboard.

12. The wireless communication device of claim 10, wherein the slot and the gap are both filled with insulating material.

13. The wireless communication device of claim 10, wherein the radiator comprises a second feed portion, a first radiating portion, a second radiating portion, and a third ground portion, one end of the second feed portion is electrically connected to the first radiating portion and the second radiating portion for feeding current to the first radiating portion and the second radiating portion, another end of the second feed portion is electrically connected to backboard; the third ground portion is positioned adjacent to the gap and is spaced apart from the second feed portion; one end of the third ground portion is electrically connected to the second radiating portion and another end of the third ground portion is electrically connected to backboard; the first radiating portion and the second radiating portion are both spaced apart from the short portion.

14. The wireless communication device of claim 13, wherein the side frame comprises an end portion, a first side portion, and a second side portion, the first side portion and the second side portion are respectively connected to two ends of the end portion; the slot is at least defined on the end portion, the first radiating portion is electrically connected to the end of the second feed portion away from the backboard and extends along a direction parallel to the end portion and towards the first side portion; the second radiating portion comprises a first radiating section and a second radiating section, one end of the first radiating section is electrically connected to a junction of the second feed portion and the first radiating portion, another end of the first radiating section extends along a direction parallel to the second side portion and towards the short portion; the second radiating section is electrically connected to the end of the first radiating section away from the second feed portion and extends along a direction parallel to the end portion and towards the first side portion, until the second radiating section is electrically connected to the end of the third ground portion away from the backboard.

15. The wireless communication device of claim 13, wherein a first portion of the front frame from a first side of the gap to a first end of the slot forms a long portion, when a current enters the long portion from the first feed portion, the current flows through the long portion and is grounded by the first ground portion, the second ground portion, and the position of the long portion adjacent to the first end to activate a first mode for generating radiation signals in a first frequency band, the first operation mode is a LTE-A low, middle, and high frequency mode.

16. The wireless communication device of claim 15, wherein a second portion of the front frame from a second side of the gap to a second end of the slot forms the short portion, the first portion is longer than the short portion, when the current enters from the second feed portion, the current flows through the first radiating portion to activate a second operation mode for generating radiation signals in a second frequency band; when the current enters from the second feed portion, the current flows through the second radiating portion and is grounded by the third ground portion to activate a third operation mode for generating radiation signals in a third frequency band; when the current enters from the second feed portion, the current flows through the second radiating portion, is electronically coupled to short portion through the second radiating portion, and is grounded through the short portion to activate a fourth operation mode for generating radiation signals in a fourth frequency band; the second operation mode is a WIFI 2.4G operation mode, the third operation mode is a WIFI 5G operation mode, and the fourth operation mode is a GPS operation mode.

17. The wireless communication device of claim 15, wherein the antenna structure further comprises a first switching circuit and a second switching circuit, the first switching circuit comprises a first switching unit and a plurality of first switching elements, the first switching unit is electrically connected to the long portion through the first ground portion, the first switching elements are connected in parallel to each other, one end of each first switching element is electrically connected to the first switching unit, and the other end of each first switching element is electrically connected to the backboard; the second switching circuit comprises a second switching unit and a plurality of second switching elements, the second switching unit is electrically connected to the long portion through the second ground portion, the second switching elements are connected in parallel to each other, one end of each second switching element is electrically connected to the second switching unit, and the other end of each second switching element is electrically connected to the backboard; and through controlling the first switching unit and/or the second switching unit to switch, the long portion is switched to different first switching elements and/or second switching elements and the first frequency band is adjusted.

18. The wireless communication device of claim 10, wherein the wireless communication device uses the long portion to receive or send wireless signals at multiple frequency bands simultaneously through carrier aggregation (CA) technology of Long Term Evolution Advanced (LTE-A).

19. The wireless communication device of claim 10, wherein the backboard is an integral and single metallic sheet, the backboard is directly connected to the side frame and there is no gap formed between the backboard and the side frame, the backboard does not define any slot, break line, and/or gap for separating the backboard.

20. The wireless communication device of claim 10, further comprising two rear camera modules, a speaker module, a front camera module, and a flash light, the two rear camera modules are positioned between the first ground portion and the second ground portion, the speaker module is positioned between the first feed portion and one of the two rear camera modules, the front camera module faces towards the gap, and the backboard defines holes for exposing the two rear camera modules and the flash light.

* * * * *